Oct. 13, 1942.  C. W. CRUMRINE  2,298,349
SAFETY LATCH FOR CAMERA MECHANISM
Filed Jan. 23, 1941   2 Sheets-Sheet 1
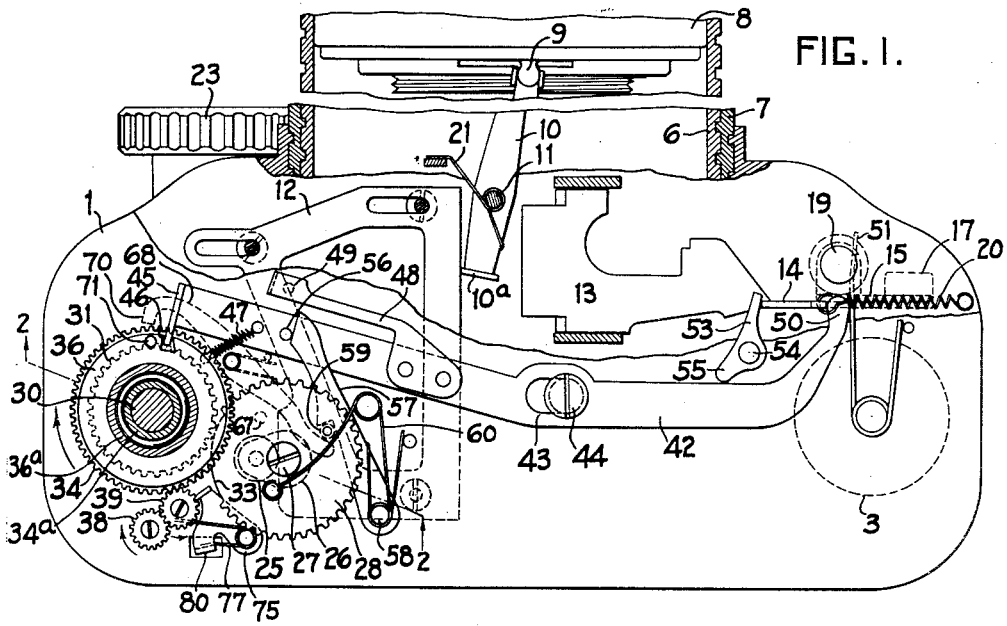
FIG. 1.
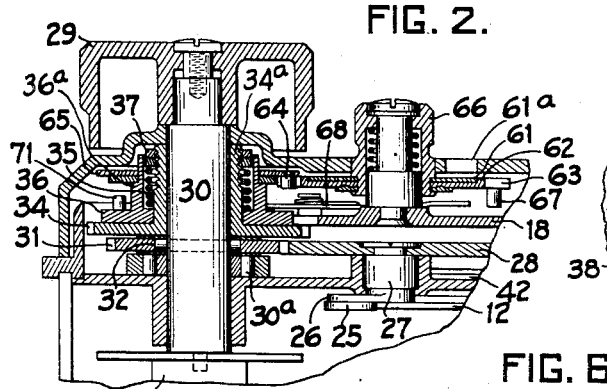
FIG. 2.
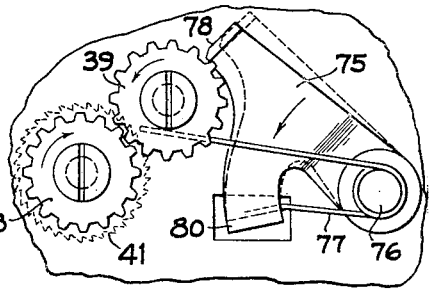
FIG. 4.
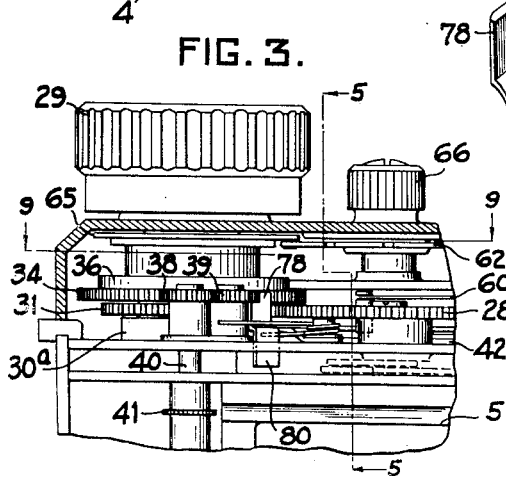
FIG. 3.
FIG. 6.
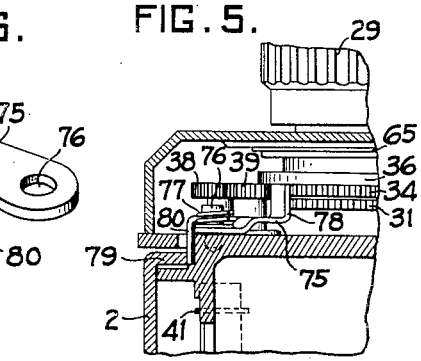
FIG. 5.
CHESTER W. CRUMRINE
INVENTOR
BY
ATTORNEYS Oct. 13, 1942.  C. W. CRUMRINE  2,298,349
SAFETY LATCH FOR CAMERA MECHANISM
Filed Jan. 23, 1941   2 Sheets-Sheet 2
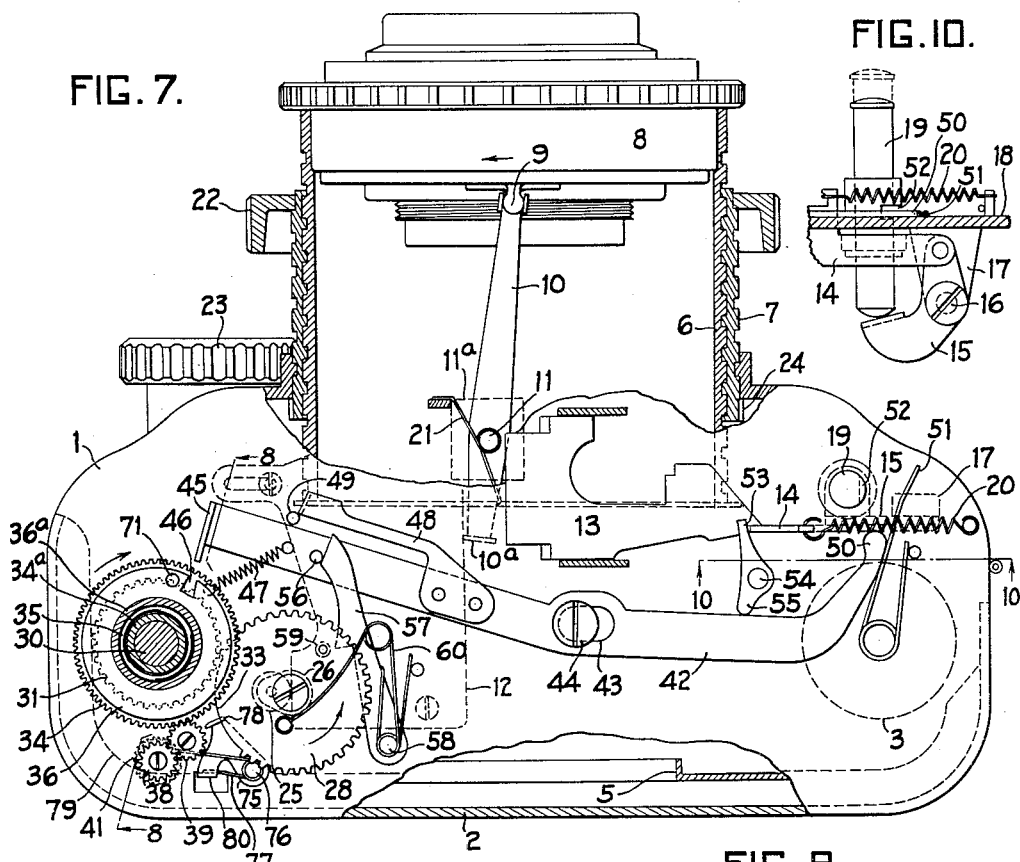
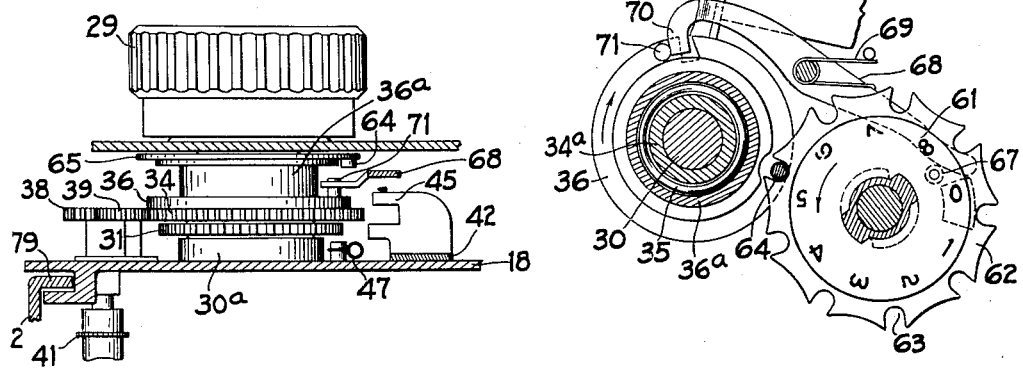
CHESTER W. CRUMRINE
INVENTOR
BY
ATTORNEYS Patented Oct. 13, 1942

2,298,349

UNITED STATES PATENT OFFICE 2,298,349

SAFETY LATCH FOR CAMERA MECHANISM

Chester W. Crumrine, Rochester, N. Y., assignor to Eastman Kodak Company, Rochester, N. Y., a corporation of New Jersey Application January 23, 1941, Serial No. 375,653

3 Claims. (Cl. 95—31)

This invention relates to photographic cameras, and particularly to safety devices for preventing improper operation of the camera. One object of my invention is to provide a camera with a double exposure prevention device the mechanism of which can not be operated when the camera is opened for loading. Another object is to provide the film winding and measuring mechanism with an automatic release permitting the mechanism to function when the camera is closed. Still another object is to provide a film camera with film controlling mechanism under the control of the camera back whereby the mechanism may function or may be operated only when the camera back is in position to close the camera body. A still further object is to provide a camera with a safety mechanism which will prevent improper manual operation of the film winding mechanism and which will insure maintaining the film measuring mechanism in phase even when the camera is opened for loading. Other objects will appear from the following specification, the novel features being particularly pointed out in the claims at the end thereof.

In photographic cameras of the type in which a camera body is provided with spool chambers separated by an exposure frame across which film may be drawn after an exposure is made, and in which a camera back movable relatively to the camera to give access to the spool chambers for loading fresh film into the camera, and unloading exposed film therefrom is used, it frequently happens that automatic film measuring mechanism is tampered with by a user in loading or removing film. This gets the mechanism out of phase. A particular type of camera to which the present invention is adapted has a toothed or pin-studded wheel in the path of the film as it passes from the supply to the receiving chamber, this wheel being driven through and by its engagement with the film. Through movement of the toothed wheel film is metered to permit only the exposed area to be wound past the exposure frame and a fresh area moved into register therewith. In the present embodiment of my invention the toothed wheel is also arranged to control the operation of a double-exposure prevention mechanism which includes shutter-setting means for automatically setting the camera shutter for the next exposure after the previously exposed portion of film has been moved past the exposure frame.

It has been found that when the back of such a camera is opened, the toothed wheel aforesaid may be inadvertently or even purposely moved, thereby disturbing the relative positions of the film-winding and double exposure prevention mechanisms, and in some cases causing them to become jammed and inoperative.

According to the invention this condition is prevented by having a latch in the form of a pivoted lever and arranged to be spring-pressed into engagement with a part connected with the toothed film-measuring wheel. This engagement will occur only when the camera back is opened or removed, and when the back is approaching its closed position a flange on the back strikes the latch and moves it out of engagement with the part which it engaged when the back was open, thereby rendering the film measuring device again operative, and insuring that the relative positions and sequential operation of the parts will not be disturbed. The portion of the latching lever that is contacted by the camera back is rendered inaccessible by placing it in a deep groove, the flange on the back, previously mentioned, being deep enough to reach the lever and move it the slight distance required to disengage it from the mechanism when the back is closed and the camera is in picture-taking condition.

It is to be understood that while the structure illustrated herewith includes a specific form of film-measuring mechanism, the invention may be applied to cameras having film measuring mechanism cooperating with different forms of double-exposure prevention devices.

In the drawings in which like reference characters denote like parts throughout:

Fig. 1 is a top plan of a camera embodying the present invention, parts being shown in section, and with the parts as they will appear with film almost wound for an exposure;

Fig. 2 is a fragmentary sectional elevation of the film-winding knob and associated parts;

Fig. 3 is a view of the same parts, not in section;

Fig. 4 is a fragmentary plan view, enlarged, of the latch aforementioned;

Fig. 5 is a section on line 5—5 of Fig. 3;

Fig. 6 is a perspective view of the latch element;

Fig. 7 is a view similar to Fig. 1 with the parts in another position, some parts being omitted for clearness;

Fig. 8 is a section on line 8—8 of Fig. 7;

Fig. 9 is a plan view of the counter and associated parts, and

Fig. 10 is a section on line 10—10 of Fig. 7.

The camera as shown in Fig. 7 herewith has a body 1, a hinged back 2, supply film spool 3 located in a suitable chamber and a receiving spool 4 to wind on the exposed film, which latter passes over the usual exposure aperture 5. The camera may have threaded focusing tubes 6 and 7, one within the other, and a lens and shutter assembly 8 mounted at the front end of the inner tube 6.

The shutter is shown as having an operating member 9, the rear end of which is engaged by a lever 10, pivoted at 11 on a lug 11a on the inside of tube 6. Movement of the member 9 as indicated in Fig. 7 sets the shutter, and movement in the opposite direction releases it. The lever 10 accomplishes both results. The setting operation occurs when a sliding frame 12 is moved toward the right by means later to be described. The shutter is released to make an exposure when a sliding plate 13 is moved toward the left. The plate 13 is moved by a link 14 (Fig. 10) connected with one arm of a bellcrank 15 pivoted at 16 to a lug 17 depending from an upper wall 18 of the camera. The bellcrank is swung about the pivot 16 when the release plunger 19 is depressed, a spring 20 serving to return the above parts to normal. The lever 10 is returned to normal position by a spring 21.

In a camera constructed as shown, the outer tube 7 may be rotated in the camera body for focusing by movement of a ferrule 22 or by a focusing knob 23 that is geared to the tube at 24. The inner tube 6 is held against rotation by slideways of well known type, not shown, which permit it to slide in and out as required. The lever 10 moves to and from the camera body with the tube, and the lug 10a at the inner end of the lever normally is held in contact with the edge of frame 12 by the action of spring 21 (Fig. 1). Therefore, the lever 10 may be operated by either the frame 12 or the plate 13 as long as the lug 10a lies within the longitudinal extent of the edges of said frame and plate.

The frame 12 is moved to set the shutter (toward the right in Fig. 1) against the action of spring 21, by a roller 25 on the end of an arm 26, the roller being rotated counterclockwise through a circular path about a pivot 27 by means of a driven gear 28. As this gear makes a complete revolution for each picture area, the shutter will be set accordingly.

The film measuring and advancing mechanism is broadly similar to that shown in the pending application of Joseph Mihalyi, Ser. No. 283,017 filed July 6, 1939. In the present construction the winding knob 29, mounted on a spindle 30 is manually rotated clockwise to advance the film. A one-way clutch 30a may be provided to prevent backward rotation of the spindle 30. A gear 31 is keyed at 32 to the spindle and is arranged to mesh with the gear 28. The latter has several teeth removed at 33, permitting gears 31 and 28 to become unmeshed during a portion of one cycle.

A gear 34 having a sleeve portion 34a is loosely mounted on the spindle 30 and by means of a spring 35 a disk 36 is pressed into contact with the upper face of gear 34, the spring tension being adjustable by lock nuts 37 threaded on the sleeve 34a. If gear 34 is rotated the disk 36 will be turned also through friction only, and if the disk is held against rotation the gear 34 may still rotate. It is desirable to have the disk 36 turned by the movement of the film through the camera, as this action is correlated with the mechanism for preventing double exposures.

Adjacent the rear edge of the camera body are meshing pinions 38 and 39, the latter meshing with gear 34. The shaft 40 of pinion 38 carries a toothed or pin wheel 41, over which the film moves while being wound onto the spool 4. The engagement of the film with the teeth of wheel 41 provides a positive drive for gear 34, the film in turn being manually moved by the knob 29, shaft 30 turning spool 4.

The double exposure prevention mechanism, which does not form a part of the present invention, is shown in Figs. 1 and 7 in order to make the complete operation of my present invention understandable. It may be briefly described as follows: A lever 42, having a slot 43 which permits rotation and limited transverse movement about pivot 44, has a forked end 45 adapted to engage a notch 46 in the disk 36 when urged by spring 47. A spring clip 48 is adapted to snap behind a pin 49 when the lever 42 is slid to its extreme right position, holding the lever until the latter is rotated clockwise about the pivot 44. Fig. 7 shows the lever so rotated, with the clip 48 about to slip off the pin 49.

As film is advanced through the camera and wound onto spool 4, the toothed wheel 41 rotates pinion 38 and through pinion 39 the gear 34 is rotated, turning disk 36 by reason of the frictional engagement previously described. Gear 28 being engaged with gear 31 at this time, the roller 25 moves frame 12 to set the shutter. As the disk 36 nears the end of one revolution, the upper part of fork 45 drops into notch 46, and this allows the lower branch of the fork to engage gear 31. The latter being keyed to spindle 30 positively moves lever 42 as far to the right as the slot 43 will permit, and the spindle 30 then cannot be turned further to wind any more film on the spool 4. As lever 42 nears its extreme right position and the spring 51 is moved out of notch 52, a pin 56 on lever 42 strikes an arm 57 pivoted at 58 and disengages the arm from a pin 59 on gear 28. A spring 60 then is free to pull gear 28 around counterclockwise and thereby engage the first tooth of gear 28 with the teeth of gear 31. The latter at this time being locked against rotation cannot move gear 28.

If now the operator depresses plunger 19, thereby releasing the shutter through movement of plate 13 lever 10 and arm 9, the link 14 will swing lever 53 about its pivot 54 and the end 55 will move lever 42 about pivot 44 allowing spring 47 to pull lever 42 to the left, where the upper branch of fork 45 will rest against the periphery of disk 36.

On the next winding movement of the knob 29, the gear 28, now meshed with gear 31, will be rotated, causing roller 25 to reset the shutter through movement of sliding frame 12. Just as the film has been moved to the next exposure area the teeth of gear 28 will have passed over gear 31 and the untoothed portion 33 will then be adjacent thereto (Fig. 1), and pin 59 will have been re-engaged by the arm 57. The shutter cannot be released with the parts in this relation. The operator may have to turn knob 29 further to finish winding the new area of film into aperture 5, but as soon as this occurs the fork 45 drops into notch 46 and also engages gear 31, so that the latter moves lever 42 to the right as before described, freeing plunger 19 from spring 51. An operator therefore cannot wind more film until the shutter has been operated, nor can the shutter be reset for another operation until film has been wound.

The exposure counter or indicator is in the form of a disk 61 bearing numerals corresponding to the possible exposures on a roll of film and including a zero figure also. These numerals may be viewed through a window 61a. The disk 61 is fixed to a member 62 similar to the well known "Geneva" gear, having notches 63 equal in number to the numerals. A pin 64 projects downwardly from a disk 65 fixed to the sleeve portion 36a (Fig. 2) of disk 36. At each revolution of disk 36 the pin 64 moves the counter one digit.

The counter may be set to "1" by the operator when the first exposure area is in place, by depressing a knob 66 to which disks 61 and 62 are attached, thus moving member 62 out of the plane of pin 64. When the disk 62 has made one revolution, starting with numeral "1," a pin 67 on its underside (represented in Fig. 1 by dotted lines) moves a lever 68 (Figs. 1 and 9) against the action of a spring 69 so as to place its end 70 in the path of a pin 71 on disk 36. In this condition disk 36 cannot reach the position where notch 46 would permit fork 45 to engage gear 31. Therefore, nothing prevents the knob 29 from being turned, and the trailer of the film roll may be wound off.

In placing a fresh roll of film in the camera, the counter is not disturbed and the leader may be wound onto spool 4. When the numeral 1 on the backing paper appears in the observation window (not shown) in camera-back 2 the operator may set the indicator to 1 as above described and proceed to the end of the roll without further observation of the numerals on the backing paper.

When the camera-back is opened, if the toothed wheel 41 is turned (no film being in the camera) either accidentally or intentionally, the relative positions of the parts will not be as required for the starting of a new film through the camera, and the mechanism will become "out of phase" or possibly jammed when winding proceeds.

To prevent this condition is the principal object of my invention, and to this end a bell-crank 75 is pivoted at 76 and is biased counter-clockwise by a spring 77 which causes an upstanding lug 78 to engage the pinion 39, thus preventing rotation of disk 36 and all movement of the double-exposure prevention mechanism and shutter operating parts hereinbefore described. However, when the camera-back 2 is closed, the usual flanged edge 79 thereof (Fig. 5) strikes a downturned lug 80 of member 75 and the latter is moved clockwise against the action of spring 77 and the lug 78 is disengaged from the pinion 39, so that when film is wound the gear 34 and disk 36 may be rotated as has been described. This is effective in preventing improper operation of the film operating mechanism and always holds the parts in position during the film loading and unloading operations when the camera back 2 is opened.

While I have described a preferred type of film mechanism in the present embodiment of my invention, it is obvious that other forms may be used and locked through operation of the camera back to and from an open or loading position. I therefore consider as within the scope of my invention all such forms of my invention as may come within the scope of the appended claims.

I claim:

1. In a roll-holding camera having a body, a shutter and a separable back, and provided with double-exposure prevention means comprising interacting film advancing and shutter operating mechanisms, the combination of a comparatively deep recess in the camera body and a projection on the camera-back adapted to enter thereinto, a latch adapted to engage a part of said mechanisms, a portion of said latch extending into said recess and inaccessible to manual interference, said latch being arranged to automatically engage and lock said mechanisms when the camera-back is opened away from the camera body, the projection on the camera-back also being adapted to move the latch and thereby to free said mechanisms when the camera-back is closed.

2. In a roll-holding camera having a body and a separable back, a shutter, film-winding mechanism, and an interacting mechanism connected with the shutter and the film winding mechanism for double-exposure prevention, the combination of a recess in the rear of the camera body, a projection on the camera-back adapted to enter said recess when the back is closed, a spring-pressed latch within the camera adapted to engage and lock the interacting mechanisms when the camera back is opened, a lug on the latch projecting into the recess and inaccessible to manual interference, the projection on the camera back being adapted to strike the lug when the camera back is closed and thereby to retract the latch to release the interacting mechanisms.

3. In a roll-holding camera having a body with a marginal recess and a separable back provided with a projection adapted to enter said recess and exclude light when the back is in closed position, the combination of a shutter, shutter-operating mechanism and film advancing mechanism, both of said mechanisms being interconnected for prevention of double exposures, a latch located within the camera body and adapted to engage a portion of said mechanisms to lock the same against movement when the camera-back is opened, a lug on said latch projecting into the marginal recess, but inaccessible to manual interference, said lug being so located that it will be engaged by the projection on the camera-back when the back is closed and thereby disengaged from said mechanisms.

CHESTER W. CRUMRINE.